Patented Oct. 20, 1931

1,827,912

UNITED STATES PATENT OFFICE

LUDWIG ROSENSTEIN, OF SAN FRANCISCO, CALIFORNIA

PROCESS OF REMOVING HYDROGEN SULPHIDE FROM OILS AND OTHER SUBSTANCES

No Drawing.    Application filed April 16, 1927.   Serial No. 184,434.

The invention relates to a process of removing hydrogen sulphide from liquids immiscible with aqueous solution, particularly hydrocarbons normally in the liquid phase and normally liquid at atmospheric pressure and has special application to products resulting from the oil cracking process.

It is therefore an object of this invention to provide a novel process for removing hydrogen sulphide from mineral oils which will be economical in operation and will have no detrimental effect upon the oil.

It is a further object of this invention to devise a novel process for regenerating alkaline solutions employed for the removal of hydrogen sulphide from materials which are either in the gaseous or liquid state.

It is a further object of this invention to devise a novel process of regenerating solutions containing soluble sulphides, which will not be accompanied by the discharge of objectionable odors.

Oils and oil products, especially products of the oil cracking process contain various amounts of sulphur compounds, including hydrogen sulphide. The presence of this hydrogen sulphide is highly objectionable, and it must be removed before the products can be marketed. In order to be commercially successfully, any process for the removal of this substance must be economical as to the nature and quantity of chemicals employed, and should not be accompanied by the discharge of objectionable odors.

The process of this invention consists generally in treating the liquid hydrocarbon with an aqueous solution whose hydroxide ion is regulated by the use of what is known as a buffer salt mixture, that is a mixture of salts which will maintain the hydroxide ion concentration between certain limits by a chemical equilibrium. This aqueous solution makes possible a chemical reaction with the hydrogen sulphide to form a water soluble sulphur compound which is removed with the solution. In addition to that feature of the invention described above, the solution is regenerated by a process of oxidation to form free sulphur which can be readily separated, so that the solution can be used repeatedly. The adjusting of the hydroxide ion concentration serves two distinct purposes;—it prevents injury to the hydrocarbon and it causes the oxidation process to take place in such a manner as to produce free sulphur as the principal product thereof.

In practicing the invention, the material which I prefer to employ comprises an aqueous solution of an alkali carbonate and bicarbonate, such as a mixture of sodium carbonate and sodium bicarbonate. I preferably employ a solution whose total alkali salt concentration is about two percent and in which the ratio of carbonate to bicarbonate is approximately one to two. A certain amount of variation from these proportions is permissible. In general the solution should be such that the hydroxide ion concentration lies between the limits of $10^{-3}$ molal and $10^{-6}$ molal. The specific solution mentioned forms a buffer salt mixture which will maintain the hydroxide ion concentration between these limits. Thus any removal of hydroxide ion from the carbonate salt, and conversely an increase in hydroxide ion concentration above a certain limit is accompanied by combination of hydroxide ion with the bicarbonate content of the solution.

The aqueous solution of sodium carbonate and bicarbonate is brought into intimate contact with the liquid hydrocarbon, as by means of mechanical agitation. A reaction occurs between the solution and the hydrogen sulphide to form sodium hydro-sulphide which is water soluble. This reaction is as follows:

(1)   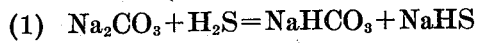

The sodium hydrosulphide is then removed from the liquid hydrocarbon together with the aqueous solution.

In order to regenerate the contaminated aqueous solution, it is treated by a process of oxidation. One simple way to accomplish this oxidation is to bring the solution in intimate contact with air. Oxidation results in the precipitation of free sulphur according to the following equation:

(2) $NaHS + NaHCO_3 + O = Na_2CO_3 + S + H_2O$

This oxidation process has been found too slow for commercial purposes when not accelerated by suitable means. Therefore as a feature of this invention I propose to employ a catalytic agent for hastening this reaction. Good results have been obtained by the use of sulphides of nickel or cobalt. As is well known, nickel and cobalt are divalent elements of the eighth group of the periodic system. Activated carbon has also been found to have the desired catalytic effect. One or more of these catalytic agents are added to the aqueous solution before the oxidation step. In practice the catalytic agent plays no part in the chemical reactions, even though present in the solution while in contact with the hydrocarbon. It is employed in minute quantities; for example quantities of nickel sulphide in the neighborhood of one thousandth percent by weight have been found to be satisfactory. I have found that efficient operation of the process is attained by using a quantity of nickel sulphide less than .01 percent nickel on the weight of the solution and therefore minute in quantity as compared to the solution or to the reacting weight of the components in the reaction which it catalyzes. The amount of nickel or cobalt salt is therefore only a very small percentage of that required by its stoichiometric relation with the sodium hydrosulphide.

In Equation (1) it will be noted that sodium bicarbonate is produced as one of the products resulting from the reaction of hydrogen sulphide and that therefore if the aqueous solution originally consisted merely of sodium carbonate, it would become a mixture of carbonate and bicarbonate during treatment of the hydrocarbon. However, if the process were carried out in this manner, complex compounds of sulphur such as sodium thiosulphate would be formed to such an extent during the subsequent oxidation process that free sulphur would not be precipitated at all or in small quantities only due to the fact that the concentration of hydroxide ion would not be properly adjusted. The sodium thiosulphate referred to above is formed as the result of a side reaction and I have observed that the presence of a substantial quantity of this substance is of decided benefit provided its rate of formation is properly controlled. Its presence aids in the smooth operation of the process and increases the rate of the reaction between soluble sulphides and oxygen. The particular manner in which it is involved is not definitely known, but its beneficial effect has been repeatedly demonstrated. If the conditions of alkalinity and the presence of sufficient catalyst are properly maintained, thiosulphate formation ceases or becomes very slow when its concentration exceeds 90 grams per liter, and I prefer to operate the process carrying approximately this concentration of thiosulphate in solution. The adjustment of hydroxide ion concentration is such that the rate of sodium thiosulphate formation does not ordinarily become so excessive as to impair the precipitation of free sulphur the adjustment being effected by the proper proportions of carbonate and bicarbonate as previously explained. Referring to Equation (2) it will be noted that sodium carbonate results from the step of oxidation so that the average proportions of carbonate and bicarbonate remain the same if the solution is used repeatedly.

The entire process is preferably conducted as a continuous cycle in which the aqueous solution is first brought into intimate contact with the hydrocarbon, is treated by oxidation for the removal of free sulphur, and the free sulphur then removed by filtration, sedimentation or centrifuging, after which the solution is again brought into contact with another quantity of hydrocarbon. The catalyst is largely removed together with the free sulphur and should be replenished at a point in the cycle after the sulphur has been removed but before the solution is subjected to the step of oxidation.

The manner in which the aqueous solution is regenerated does not require large volumes of air or other gas to be blown through the solution and so practically no objectionable hydrogen sulphide gases are discharged into the atmosphere.

I claim:

1. A process of removing hydrogen sulphide from hydrocarbon normally in the liquid phase which comprises contacting the hydrocarbon with an aqueous regenerative solution of sodium carbonate and sodium bicarbonate, the alkalinity of the solution being maintained substantially between the limits of $10^{-3}$ and $10^{-6}$ molal.

2. A process of removing hydrogen sulphide from hydrocarbon normally in the liquid phase consisting in treating the product with an alkaline solution, then treating the fouled liquor with air in the presence of a catalyst containing nickel sulphide, whereby the nickel sulphide catalyzes the oxidation of the dissolved sulphide with the separation of free sulphur and returning the regenerated solution to the product treating stage, the nickel sulphide appearing substantially unchanged throughout the process.

3. A process of removing hydrogen sulphide from hydrocarbon normally liquid at atmospheric pressure which comprises contacting the hydrocarbon with an aqueous alkaline solution which reacts with the hydrogen sulphide to form a water soluble sulphide, removing the solution from contact with the hydrocarbon, contacting the solution with air in the presence of a minute quantity of a catalyst whereby the air oxidizes the soluble sulphides and liberates free sulphur, removing the free sulphur from the solution, and returning the solution to contact with the hydrocarbon.

4. A process of removing hydrogen sulphide from hydrocarbon normally in the liquid phase which comprises contacting the hydrocarbon with an aqueous alkaline solution having an adjusted hydroxide ion concentration whereby the solution reacts with the hydrogen sulphide to form water-soluble sulphide, substantially separating the hydrocarbon from contact with the solution, contacting the solution with air in the presence of a minute quantity of a catalyst whereby the solution is regenerated and free sulphur is liberated, and returning the regenerated solution to contact with the hydrocarbon.

5. A process of removing hydrogen sulphide from hydrocarbons normally in the liquid phase which comprises contacting the hydrocarbons with a solution of an alkaline metal hydroxide whereby a soluble sulphide of the alkaline metal is formed in the solution, removing the solution from contact with the hydrocarbon regenerating the solution by contacting the solution with air in the presence of a minute quantity of a catalyst whereby free sulphur is liberated from the solution, and returning the regenerated solution to contact with additional hydrocarbons to be freed of hydrogen sulphide.

6. A process of removing hydrogen sulphide from hydrocarbons which comprises contacting the hydrocarbon with an aqueous solution of alkali metal carbonate and bicarbonate which reacts with the hydrogen sulphide to form a water soluble sulphide, the proportion of carbonate and bicarbonate being such as to maintain the alkalinity of the solution substantially between a value of $10^{-3}$ and $10^{-6}$ molal, removing the solution from contact with the hydrocarbon, contacting the solution with an oxidizing agent in the presence of a minute quantity of a catalyst whereby the soluble sulphides are oxidized and free sulphur is liberated, removing the free sulphur from the solution, and returning the solution to contact with the hydrocarbon.

7. A process of removing hydrogen sulphide from hydrocarbon which comprises contacting the hydrocarbon with an aqueous solution of sodium carbonate and bicarbonate which reacts with the hydrogen sulphide to form a water soluble sulphide, the proportion of carbonate and bicarbonate being such as to maintain the alkalinity substantially between the limits of $10^{-3}$ and $10^{-6}$ molal in the solution, removing the solution from contact with the hydrocarbon, contacting the solution with an oxidizing agent in the presence of a minute quantity of a catalyst whereby the soluble sulphides are oxidized to liberate free sulphur, removing the free sulphur from the solution, and returning the solution to contact with the hydrocarbon.

In testimony whereof, I have hereunto set my hand.

LUDWIG ROSENSTEIN.